United States Patent
Poole et al.

(10) Patent No.: US 10,163,040 B2
(45) Date of Patent: Dec. 25, 2018

(54) CLASSIFICATION METHOD AND APPARATUS

(71) Applicant: Toshiba Medical Systems Corporation, Otawara-shi (JP)

(72) Inventors: Ian Poole, Edinburgh (GB); Aneta Lisowska, Edinburgh (GB); Erin Beveridge, Edinburgh (GB); Ruixuan Wang, Edinburgh (GB)

(73) Assignee: TOSHIBA MEDICAL SYSTEMS CORPORATION, Otawara-shi (JP)

( * ) Notice: Subject to any disclaimer, the term of this patent is extended or adjusted under 35 U.S.C. 154(b) by 177 days.

(21) Appl. No.: 15/216,006

(22) Filed: Jul. 21, 2016

(65) Prior Publication Data

US 2018/0025255 A1   Jan. 25, 2018

(51) Int. Cl.
| | | |
|---|---|---|
| G06K 9/62 | (2006.01) |
| G06T 7/00 | (2017.01) |
| G06T 7/60 | (2017.01) |
| G06T 7/33 | (2017.01) |

(52) U.S. Cl.
CPC ......... G06K 9/6277 (2013.01); G06K 9/6254 (2013.01); G06K 9/6256 (2013.01); G06T 7/0014 (2013.01); G06T 7/0028 (2013.01); G06T 7/337 (2017.01); G06T 7/608 (2013.01); G06K 2209/051 (2013.01); G06T 2207/10081 (2013.01); G06T 2207/20048 (2013.01); G06T 2207/20076 (2013.01);
(Continued)

(58) Field of Classification Search
USPC .......... 382/128, 131, 155, 159, 224
See application file for complete search history.

(56) References Cited

U.S. PATENT DOCUMENTS

| | | | | |
|---|---|---|---|---|
| 9,159,127 B2* | 10/2015 | Meetz | ............... | G06T 7/0012 |
| 2009/0028403 A1* | 1/2009 | Bar-Aviv | ............... | G06F 19/321 |
| | | | | 382/128 |
| 2009/0304251 A1 | 12/2009 | Zheng et al. | | |

(Continued)

FOREIGN PATENT DOCUMENTS

| | | |
|---|---|---|
| JP | 2000-123154 A | 4/2000 |
| JP | 2006-43007 A | 2/2006 |
| JP | 2010-349 A | 1/2010 |

OTHER PUBLICATIONS

Matesin et al., A Rule-Based Approach to Stroke Lesion Analysis from CT Brain Images, IEEE ISBN 953-96769-4-0, Aug. 7, 2002, pp. 219-223.*

(Continued)

Primary Examiner — Ishrat I Sherali
(74) Attorney, Agent, or Firm — Oblon, McClelland, Maier & Neustadt, L.L.P.

(57) ABSTRACT

A medical image data processing apparatus comprises processing circuitry configured to: receive a plurality of sets of medical imaging data; and train a classifier for use in classification, wherein the training of the classifier comprises, for each of the plurality of sets of medical imaging data: selecting a first part and a second part of the respective set of medical imaging data, wherein the first part and the second part are representative of different regions of the same subject; and training the classifier for use in classification based on the first part of the set of medical imaging data and the second part of the set of medical imaging data.

18 Claims, 8 Drawing Sheets

(52) U.S. Cl.
CPC .............. *G06T 2207/20081* (2013.01); *G06T 2207/30016* (2013.01); *G06T 2207/30101* (2013.01)

(56) References Cited

U.S. PATENT DOCUMENTS

| | | | |
|---|---|---|---|
| 2016/0005183 A1* | 1/2016 | Thiagarajan | A61B 5/055 382/131 |
| 2016/0220166 A1* | 8/2016 | Thornton | A61B 5/4064 |

OTHER PUBLICATIONS

Mayank Chawla, et al., "A Method for Automatic Detection and Classification of Stroke from Brain CT Images" Engineering in Medicine and Biology Society, Annual International Conference of the IEEE Engineering in Medicine and Biology Society, Sep. 2009, 6 Pages.

Konstantinos Kamnitsas, et al., "Multi-Scale 3D Convolutional Neural Networks for Lesion Segmentation in Brain MRI" Ischemic Stroke Lesion Segmentation, vol. 13, 2015, 4 Pages.

Qi Dou, et al., "Automatic Detection of Cerebral Microbleeds From MR Images via 3D Convolutional Neural Networks" IEEE Transactions on Medical Imaging, vol. 35, No. 5, May 2016, pp. 1182-1195.

Mohammad A. Dabbah, et al., "Detection and location of 127 anatomical landmarks in diverse CT datasets" Proc. of SPIE, Medical Imaging 2014: Image Processing, vol. 9034, No. 903415, Mar. 21, 2014, pp. 903415-1-903415-11.

Matthew Browne, et al., "Convolutional neural networks for image processing: an application in robot vision" The 16th Australian Joint Conference on Artificial Intelligence—AI'03, Dec. 2003, 14 Pages.

Jelmer M. Wolterink, et al., "Automatic Coronary Calcium Scoring in Cardiac CT Angiography Using Convolutional Neural Networks" Medical Image Computing and Computer-Assisted Intervention—MICCAI 2015, 18th International Conference, Munich, Germany, Oct. 5-9, 2015 Proceedings, Part I, pp. 589-596.

* cited by examiner

//CLASSIFICATION METHOD AND APPARATUS

FIELD

Embodiments described herein relate generally to a method of, and apparatus for, classification in medical imaging data.

BACKGROUND

Detection of subtly discriminated regions in volumetric medical imaging may be challenging.

One example of detection of subtly discriminated regions is the detection of early ischemic signs in non-contrast computed tomography (NCCT) for acute stroke. In such detection, the main pathology or pathologies of interest may comprise dense vessels (thrombus) and areas of ischemia and infarcts. In some circumstances, dense vessels may be challenging to detect due to the proximity of bone. In some circumstances, ischemia and/or infarcts may be challenging to detect due to the subtlety of intensity and texture changes. Areas of ischemia and/or infarcts in the brain may appear in CT images as areas of slightly lowered intensity. There may be a loss of distinction between grey matter and white matter.

Some examples of subtle stroke signs are listed as a) to e) below:—
a) Low density in insular cortex due to acute infarct.
b) Loss of differentiation of basal ganglia. Lentiform nucleus lost on right side.
c) Loss of grey/white matter in acute right middle cerebral artery (MCA) infarct.
d) Dense vessel (MCA).
e) Old ischemic change.

In some circumstances, if a naïve classifier were to be used to detect subtle stroke signs, it may be the case that normal calcification of arteries could be confused with abnormal dense vessel signs.

BRIEF DESCRIPTION OF DRAWINGS

Embodiments are now described, by way of non-limiting example, and are illustrated in the following figures, in which.

DETAILED DESCRIPTION

Certain embodiments provide a medical image data processing apparatus comprising processing circuitry configured to: receive a plurality of sets of medical imaging data; and train a classifier for use in classification, wherein the training of the classifier comprises, for each of the plurality of sets of medical imaging data: selecting a first part and a second part of the respective set of medical imaging data, wherein the first part and the second part are representative of different regions of the same subject; and training the classifier for use in classification based on the first part of the set of medical imaging data and the second part of the set of medical imaging data.

Certain embodiments provide a medical image data processing method comprising: receiving a plurality of sets of medical imaging data; and training a classifier for use in classification, wherein the training of the classifier comprises, for each of the plurality of sets of medical imaging data: selecting a first part and a second part of the respective set of medical imaging data, wherein the first part and the second part are representative of different regions of the same subject; and training the classifier for use in classification based on the first part of the set of medical imaging data and the second part of the set of medical imaging data.

Figure 1:
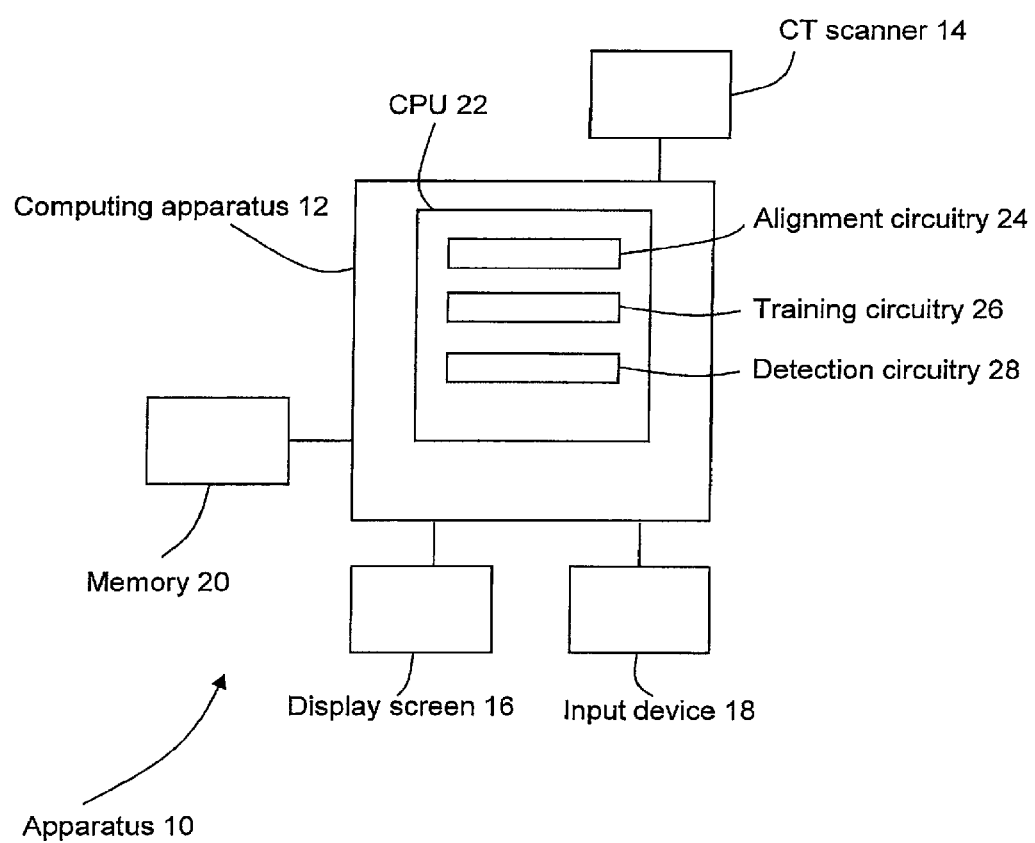
FIG. 1 is a schematic diagram of an apparatus according to an embodiment.

An imaging data processing apparatus 10 according to an embodiment, which is configured to train a classifier for detecting a pathology and to use the classifier to detect pathology, is illustrated schematically in FIG. 1. In the present embodiment, the classifier is trained to detect thrombus. In other embodiments, a classifier may be trained to detect any suitable abnormality, for example ischemia or any other relevant pathology. In further embodiments, a classifier may be trained for the analysis of images that are indicative of function, for example tissue motion or liquid flow.

The imaging data processing apparatus 10 comprises a computing apparatus 12, in this case a personal computer (PC) or workstation, which is connected to a CT scanner 14, one or more display screens 16 and an input device or devices 18, such as a computer keyboard, mouse or trackball.

The CT scanner 14 may be any CT scanner that is configured to obtain volumetric imaging data that is representative of at least one anatomical structure of a patient or other subject.

In the present embodiment, the anatomical structure is the brain. In other embodiments, the anatomical structure may be any anatomical structure that is substantially symmetrical. A substantially symmetrical anatomical structure may be an anatomical structure that, in a normal patient and in the absence of pathology, may be expected to look similar to its mirror image.

A substantially symmetrical anatomical structure may be substantially symmetrical about a line of symmetry, which may be a sagittal line of symmetry. Examples of substantially symmetrical anatomical structures may include a brain, a skull, a jaw, a vertebra, a spine, a pelvis, a bladder, a ribcage. In some embodiments, the substantially symmetrical anatomical structure may comprise a pair of related anatomical structures, for example a pair of eyes, a pair of ears, a pair of lungs, a pair of kidneys, a pair of joints, a pair of limbs, a pair of hands, a pair of feet, a pair of shoulders. If the related anatomical structures are moveable relative to each other (for example, the hands) a controlled acquisition may be used in which the anatomical structures are positioned in a particular configuration. For example, the hands of a patient may be placed side by side before scanning.

In alternative embodiments, the CT scanner 14 may be replaced or supplemented by a scanner configured to obtain two-dimensional or three-dimensional imaging data in any other imaging modality, for example a CT scanner, cone-beam CT scanner, MRI (magnetic resonance imaging) scanner, X-ray scanner, ultrasound scanner, PET scanner (positron emission tomography) or SPECT (single photon emission computed tomography) scanner. In one example, the CT scanner 14 is replaced by a scanner configured to obtain two-dimensional planar radiographs.

In the present embodiment, volumetric imaging data sets obtained by the CT scanner 14 are stored in memory 20 and subsequently provided to computing apparatus 12. In an alternative embodiment, volumetric imaging data sets are supplied from a remote data store (not shown) which may form part of a Picture Archiving and Communication System (PACS). The memory 20 or remote data store may comprise any suitable form of memory storage.

Computing apparatus 12 provides a processing resource for automatically or semi-automatically processing imaging data sets, and comprises a central processing unit (CPU) 22.

The computing apparatus 12 includes alignment circuitry 24 configured to align data sets with an atlas, training circuitry 26 configured to train a classifier, and detection circuitry 28 configured to detect pathology using the trained classifier.

In the present embodiment, the circuitries 24, 26, 28 are each implemented in computing apparatus 12 by means of a computer program having computer-readable instructions that are executable to perform the method of the embodiment. However, in other embodiments, the various circuitries may be implemented as one or more ASICs (application specific integrated circuits) or FPGAs (field programmable gate arrays).

The computing apparatus 12 also includes a hard drive and other components of a PC including RAM, ROM, a data bus, an operating system including various device drivers, and hardware devices including a graphics card. Such components are not shown in FIG. 1 for clarity.

Figure 2:
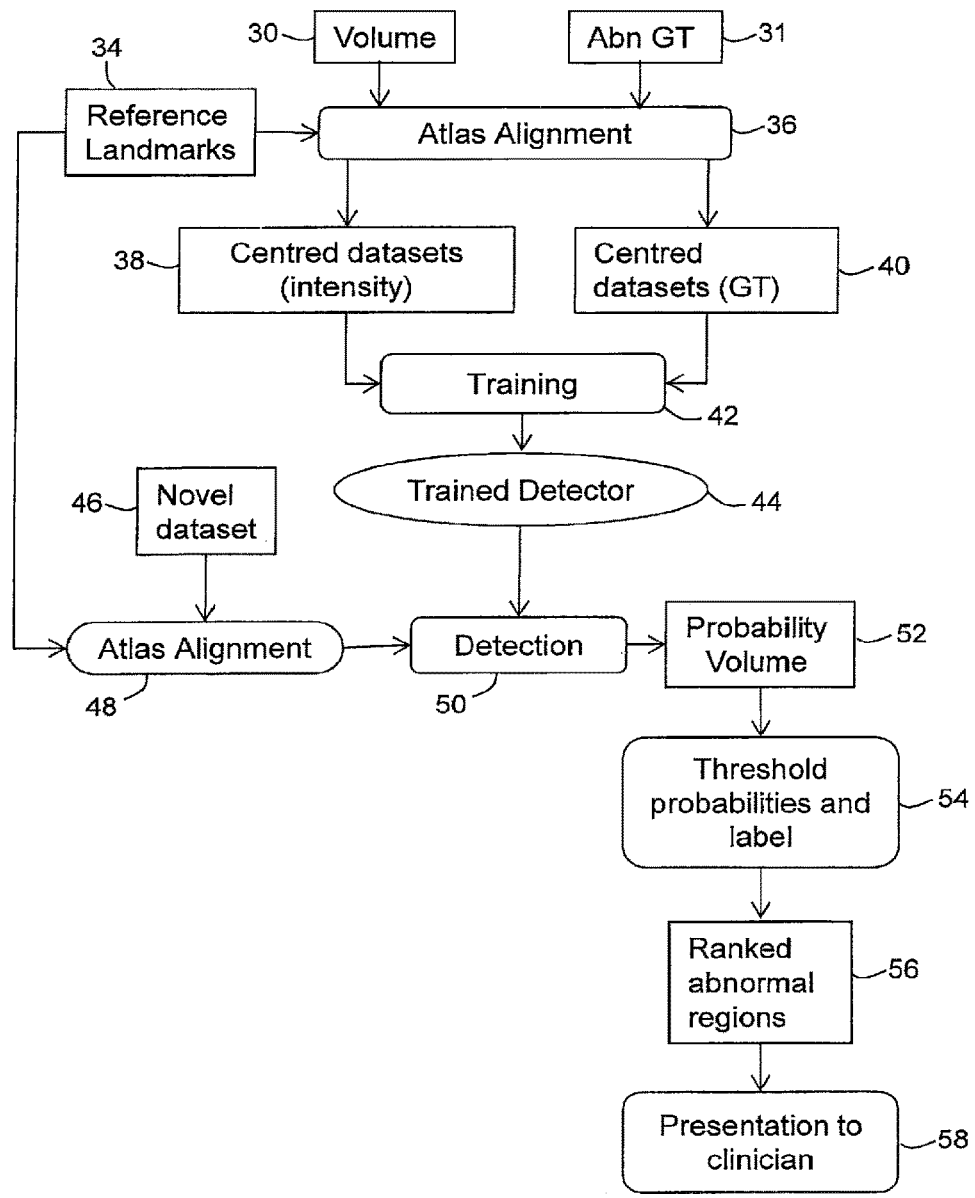
FIG. 2 is a flowchart illustrating in overview a training and detection method according to an embodiment.

The apparatus of FIG. 1 is configured to perform a process as shown in overview in FIG. 2. The process of FIG. 2 comprises an atlas alignment process as shown in overview in FIG. 5, a training process as shown in overview in FIG. 6, and a detection process as shown in overview in FIG. 9.

Figure 6:
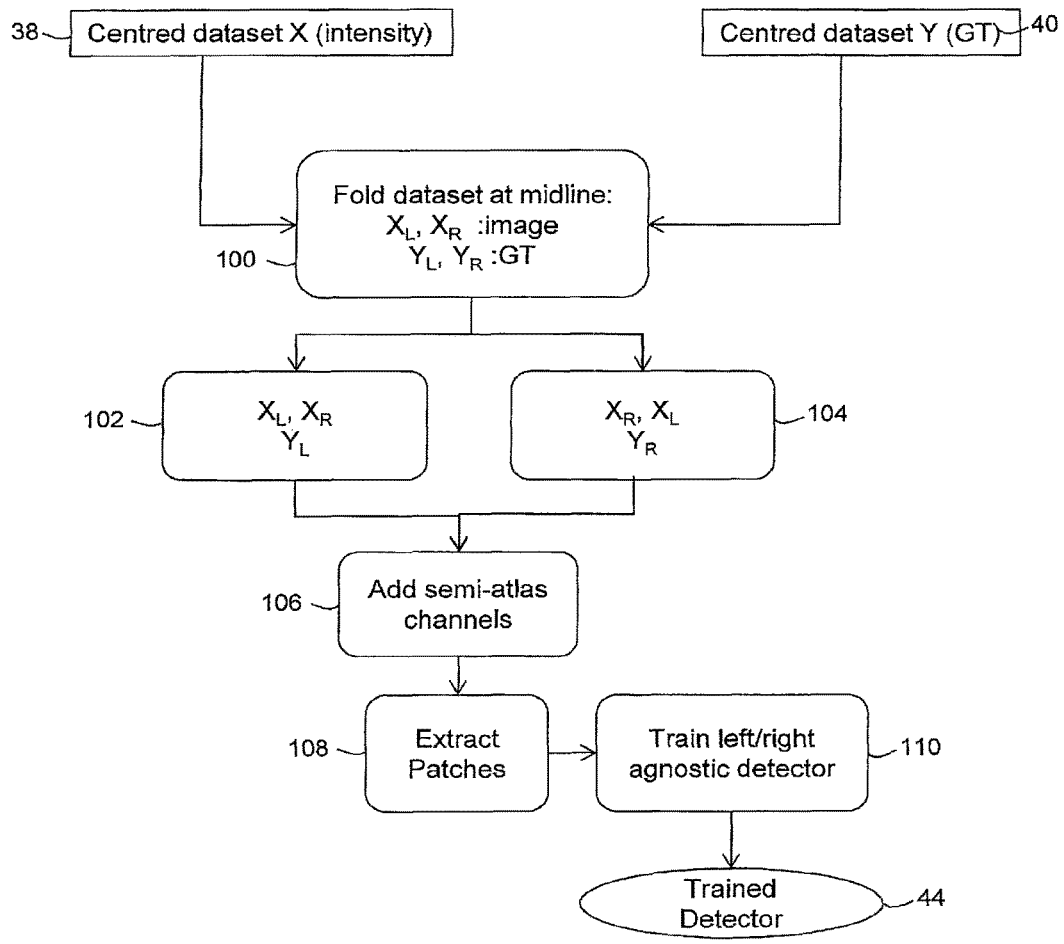
FIG. 6 is a flowchart illustrating in overview a detector training method according to an embodiment.
Figure 9:
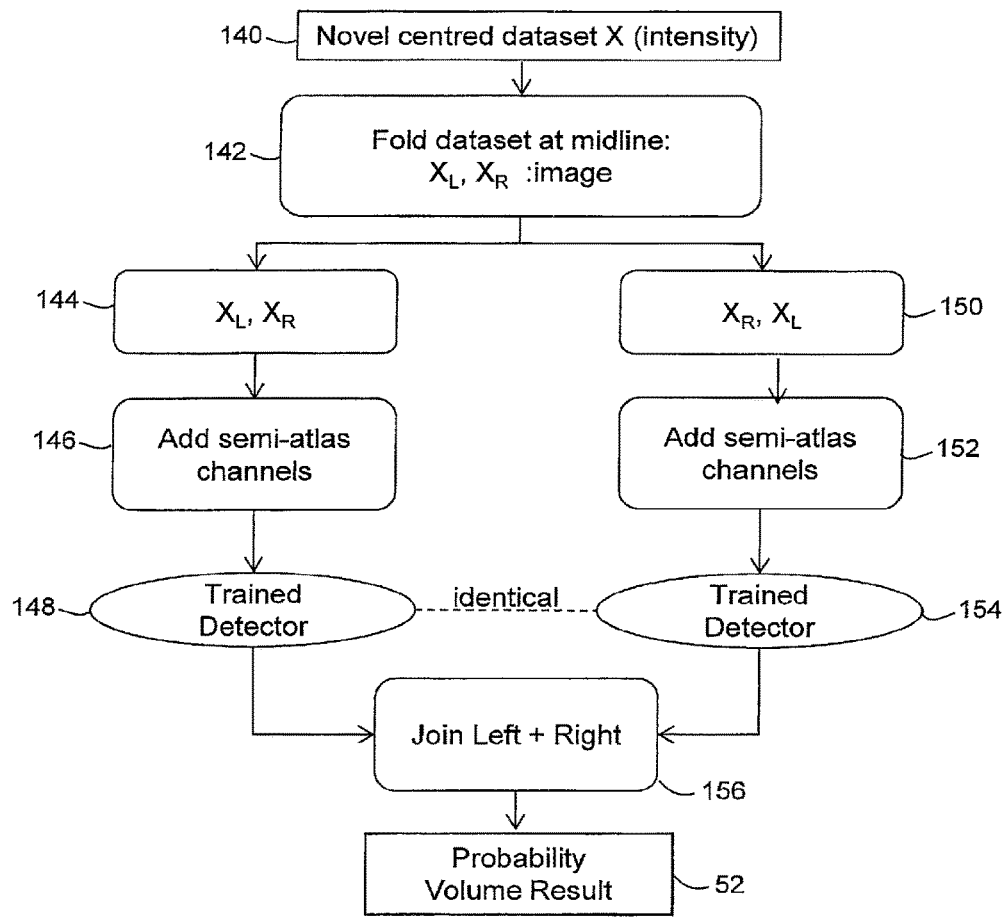
FIG. 9 is a flowchart illustrating in overview a detection method according to an embodiment.

In the present embodiment, the computing apparatus 12 is configured to perform both a classifier training process having a series of stages as illustrated in overview in FIG. 6, and a detection process having a series of stages as illustrated in overview in FIG. 9. In alternative embodiments, a first apparatus is configured to perform the process of FIG. 6 to train at least one classifier, and one or more second apparatuses are configured to perform the process of FIG. 9 to subsequently use the trained classifier or classifiers to detect an abnormality or abnormalities in sets of image data. Thus, for example, classifiers may be trained initially by one computer based on training data sets, and the trained classifiers may be distributed to, and subsequently used by, various further computers (for example, workstations for use by radiologists or other operators, or central servers) to classify further image data sets.

Before the process of FIG. 2 is performed, training data sets 30 are obtained that are representative of the abnormality of interest and are taken in a modality of interest. In the present embodiment, the training data sets 30 comprise non-contrast CT imaging data sets obtained from CT scans of the brains of a plurality of training subjects. Each of the training data sets 30 has been identified by an expert as exhibiting signs of a pathology of interest, which in this embodiment is thrombus. In other embodiments, the training data sets may be representative of a different anatomical structure, a different abnormality and/or a different modality. For example, in one embodiment the training data sets comprise planar radiographs representative of the pelvis, and the abnormality comprises fracture of the pelvis.

A thrombus may be a blood clot. In some circumstances, a thrombus may block a blood vessel, preventing or reducing the flow of blood through that vessel. Thrombus may appear in a CT scan as a region of a vessel having a higher density than other vessel regions. In some circumstances, the signs of thrombus may be referred to as dense vessels. A region of thrombus may show on a CT scan as an abnormally dense vessel structure.

In the present embodiment, 100 training data sets 30 are obtained. Each training data set 30 is an imaging data set that has been acquired by performing a CT scan of the brain of a respective subject. Each training data set 30 comprises an array of voxels and associated intensities, with each voxel being representative of a corresponding spatial location in the CT scan.

For each of the training data sets 30, an expert (for example, a radiologist) manually identifies regions of thrombus in the training data set 30. For example, the expert may draw a boundary around the or each region of thrombus. A ground truth data set 31 associated with the training data set 30 is obtained based on the input of the expert. The ground truth data set 31 provides an indication of which voxels of the training data set 30 were determined by the expert to be normal and which voxels of the training data set 30 were determined by the expert to be abnormal. For example, voxels that are outside a boundary drawn by the expert may be considered to be normal and voxels that are inside a boundary drawn by the expert may be considered to be abnormal.

Although in the present embodiment the expert has identified regions of thrombus, in other embodiments the expert may identify regions of any appropriate abnormality, for example any appropriate pathology. The expert identifies regions of the abnormality for which a classifier is to be trained. In some embodiments, the expert identifies regions of more than one abnormality, and a respective classifier is trained for each abnormality. In some embodiments, the expert identifies regions having any appropriate characteristic. For example, the expert may identify regions of tissue motion or liquid flow.

The ground truth data set 31 corresponding to a given training data set 30 may comprise an array corresponding in size to the array of voxels of the training data set 30. In the ground truth data set 31, voxels determined by the expert to be normal may be represented by one number (for example, −1) while voxels determined by the expert to be abnormal are represented by a different number (for example, 1). In other embodiments, any suitable format for the ground truth data may be used.

In the present embodiment, voxels of a training data set 30 that have been designated as abnormal (for example, voxels inside a boundary drawn by the expert) are represented in a corresponding ground truth data set 31 by the number 1. Each training data set 30 comprises one or more regions of abnormality, each region of abnormality comprising only abnormal voxels.

In further embodiments, the regions identified by the expert may be any appropriate regions, which may or may not be indicative of abnormalities. Voxels determined to be in regions having different characteristics may be represented by different numbers.

Figure 3:
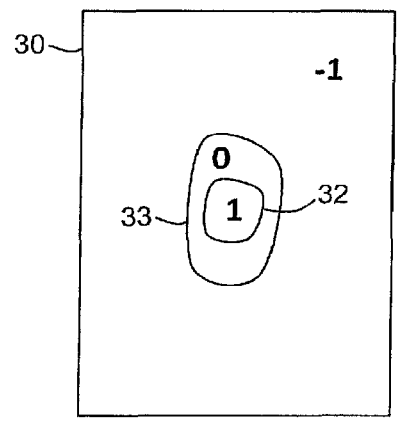
FIG. 3 is a schematic illustration of a data set comprising an abnormal region.

FIG. 3 is a schematic diagram that is representative of a training data set 30. A region 32 of the training data set 30 has been identified by an expert as an abnormal region. Each voxel in the abnormal region 32 is designated as an abnormal voxel and assigned the number 1.

In the present embodiment, the ground truth data set 31 is modified to designate some voxels as voxels that are not to be used in classifier training. Such voxels may be referred to as don't-care voxels. In the present embodiment, don't-care voxels are assigned the number 0. Don't-care voxels may comprise, for example, voxels that lie on or near a boundary between normal and abnormal voxels. Don't-care voxels may in some circumstances comprise voxels for which it may be unclear whether the voxel is normal or abnormal.

In the present embodiment, the training circuitry 26 dilates each region of abnormality to obtain a dilated region. For example, the processing circuitry may dilate the region of abnormality by 2 or 3 voxels in each direction. The processing circuitry then designates as a don't-care voxel each voxel that is in the dilated region but not in the region of abnormality. Voxels of the training data set 30 that are designated as don't-care voxels are represented in the corresponding ground truth data set by the number 0. The remaining voxels (voxels that are neither abnormal or don't-care) are represented in the ground truth data set by the number −1, and may be described as normal voxels.

In FIG. 3, the abnormal region 32 is dilated to obtain a dilated region 33. Voxels that are in the dilated region 33 but not in the abnormal region 32 are designated as don't-care voxels and assigned the number 0. Voxels that are in neither the abnormal region nor the dilated region are designated as normal voxels and assigned the number −1.

The ground truth data set 31, once it has been modified to include don't-care voxels, identifies each of the voxels of its corresponding training data set 30 as either an abnormal voxel, a normal voxel, or a don't-care voxel.

The process of FIG. 2 comprises training a classifier to distinguish between normal and abnormal voxels (in this embodiment, the classifier is trained to identify voxels of thrombus as abnormal). By designating voxels that are at or near a boundary between normal and abnormal as don't-care voxels, and excluding those don't-care voxels from the training of the classifier, the training of the classifier to distinguish between normal and abnormal voxels may in some cases be improved. In some circumstances, it may be more important for the classifier to be trained to find most or all abnormal voxels than it is for the classifier to be trained to correctly detect an exact boundary of an abnormal region. Excluding voxels near the boundary of the abnormal region from the training of the classifier may in some circumstances provide faster and/or more effective training of the classifier.

Although in the present embodiment don't-care voxels are excluded from the training of the classifier, in other embodiments an importance of the don't-care voxels in the training of the classifier may be adjusted in any suitable manner, which may or may not involve excluding the don't-care voxels. For example, the importance of the don't-care voxels may be reduced without excluding the don't-care voxels.

In other embodiments, no designating of voxels as don't-care voxels is performed. The ground truth data set 31 identifies each voxel of the training data set 30 as either a normal voxel or an abnormal voxel.

At stage 36 of the flowchart of FIG. 2, the alignment circuitry 24 receives the plurality of training data sets 30 (each of which may be referred to as an imaging data set or imaging volume) and a corresponding plurality of sets of ground truth data 31. Each ground truth data set 31 represents normal, don't-care, and abnormal voxels in its corresponding training data set 30 by −1, 0 and 1 respectively.

The alignment circuitry 24 also receives a set of reference landmarks 34 for use in atlas alignment. The set of reference landmarks 34 comprises the locations of a plurality of anatomical landmarks in an atlas data set. The locations are expressed as x, y, z coordinates in a coordinate space of the atlas data set.

The atlas data set may comprise a set of reference data, for example a set of volumetric imaging data that is representative of all or part of a human body. The atlas data set may be an imaging data set that is segmented to identify anatomical structures and/or in which anatomical structures are labelled. The atlas data set may be substantially symmetrical in a sense in which the human body is substantially symmetrical, i.e. it has a sagittal line of symmetry around which many (but not all) of its anatomical structures are substantially symmetrical. A coordinate system of the atlas data set may be defined such that the sagittal line of symmetry of the atlas data set defines the centre of a left-right axis of the atlas data set.

An anatomical landmark is usually a well-defined point in an anatomy (for example, the human anatomy). Anatomical landmarks may be defined anatomically, in relation to anatomical structures such as bones, vessels or organs. An anatomical landmark may be located in a data set and assigned a set of coordinates in the coordinate frame of that data set. The location of an anatomical landmark may be regarded as a point in coordinate space.

In the present embodiment, the set of reference landmarks 34 comprises landmarks in or near the brain. Examples of such landmarks may include the pineal gland and the base of the pituitary gland.

At stage 36, the alignment circuitry 24 aligns each of the training data sets 30 and ground truth data sets 31 to the atlas data set for which the set of reference landmarks 34 is provided. Any suitable alignment method may be used at stage 36 to align the training data sets 30 to the atlas data set based on the landmarks. In further embodiments, an alignment method may be performed in which landmarks are not used. In some such embodiments, no reference landmarks 34 may be provided to the alignment circuitry 24.

In some embodiments, the training data sets 30 are aligned to the atlas data set using image registration. For example, each training data set 30 may be aligned to the atlas data set by performing a rigid registration of the training data set 30 to the atlas based on voxel intensities. The rigid registration may optionally be followed by a non-rigid registration.

By aligning each training data set 30 to the atlas data set at stage 36, each training data set 30 may be aligned so that it is centred on its sagittal line of symmetry. Each training data set, once aligned, may be substantially symmetrical in the same sense as the atlas data set, i.e. centred on its sagittal line of symmetry.

It should be noted that each aligned data set (and the atlas data set itself) may be unlikely to have identical intensities on each side of its sagittal line of symmetry. In some cases, there are expected differences between the right side and the left side of the body. In some cases, a pathology or other abnormality may cause a difference between the right side and the left side (a fact which is used in the training of the classifier).

In the present embodiment, a symmetrical portion of the atlas data set is defined in the atlas data set. The symmetrical portion of the atlas data set may be referred to as a block. For each training data set 30, as part of stage 36 the alignment circuitry 24 selects a symmetrical portion of each training data set 30 once the training data set 30 has been aligned to the atlas data set, where the symmetrical portion of the training data set 30 corresponds to the symmetrical portion of the atlas data set. The symmetrical portion of the aligned training data set may be referred to as a midline centred data set 38.

The symmetrical portion of the atlas data set may be a sub-region of a region represented by the atlas data set. The symmetrical portion may be symmetrical in that it comprises an equal number of voxels on each side of the line of symmetry. Each voxel on one side of the line of symmetry has a corresponding, mirror-image, voxel on the other side of the line of symmetry.

Although in the present embodiment, only one symmetrical portion of the atlas data set is defined, in other embodiments a plurality of symmetrical portions of the atlas data set are defined. For example, a plurality of blocks may be defined such that most or all of atlas set is covered by the blocks.

The symmetrical portion of the atlas data set may be a portion of the aligned data set in which abnormalities (in this embodiment, thrombus) may be considered to be likely to occur. In some circumstances, the symmetrical portion may be selected based on ground truth data. For example, the symmetrical portion may represent an anatomical region in which, from the ground truth data, it is known that the abnormality of interest often occurs. The symmetrical portion may be selected based on the position of at least one anatomical structure. For example, a symmetrical portion may be selected that includes the pineal gland. The symmetrical portion may be defined on the atlas set using segmentation and/or labelling of anatomical structures that is available in the atlas data set.

Figure 4:
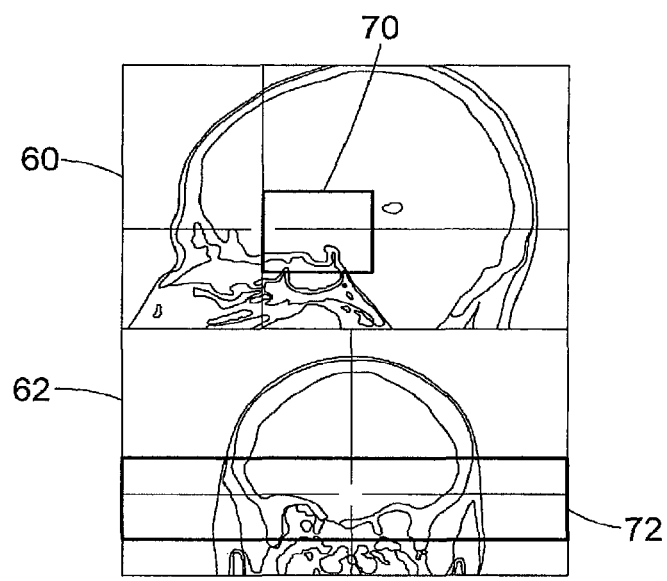
FIG. 4 is a schematic illustration of a symmetrical region of a data set.

FIG. 4 shows an example of the selection of a block. Images 60 and 62 are views of the atlas data set. A symmetrical volumetric portion (shown on FIG. 4 as regions 70, 72) of the atlas data set is highlighted.

Although in the present embodiment a block of volumetric data is selected at stage 36, in other embodiments the entire aligned training data set is used as the midline centred data set 38 for subsequent stages of the process of FIG. 2. In other embodiments, multiple blocks may be selected at stage 36, and each of the multiple blocks may be used to train a different classifier.

Selecting a block of volumetric data on which to train the classifier instead of training the classifier on the entire aligned volumetric data set may in some circumstances make the training of the classifier faster and/or more effective. In some circumstances, the classifier may have better performance if it is trained on a block (for example, a block covering a small part of the brain) instead of on the entire aligned training data set (for example, a training data set covering the whole of the brain). Training on a more specific environment may cause the training of the classifier to be more effective. A learning task performed by the training circuitry 26 maybe made easier by being made more specific. The classifier may not need to generalise as much as if it were trained on a larger volume.

The block may comprise a region at the edge of the block that may be referred to as a processing margin. When the classifier is trained, it may not be trained on the voxels in the processing margin. However, data for the voxels in the processing margin may be used to train other voxels that are not part of the processing margin. For example, for each voxel for which the classifier is trained, the classifier may use convolution kernels that use data from surrounding voxels, which may in some cases include voxels in the processing margin. The size of the processing margin may depend on a size of convolution kernels used.

In embodiments in which multiple blocks are used in training multiple classifiers, the blocks may be defined such that they overlap at least by the width of a processing margin. This may ensure that there are no anatomical regions for which no classifier is trained.

Figure 5:
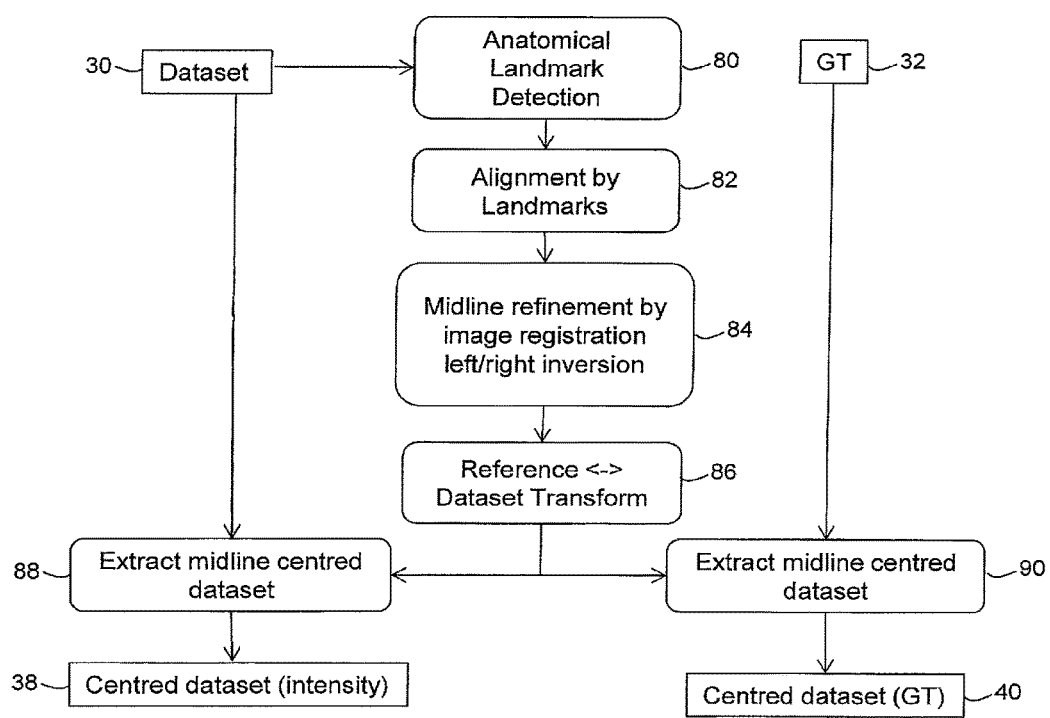
FIG. 5 is a flowchart illustrating in overview an atlas alignment method according to an embodiment.

The method used by the alignment circuitry 24 to perform stage 36 in the present embodiment is shown in overview in the flowchart of FIG. 5. The method of FIG. 5 is performed for each training data set 30 and associated ground truth data set 31.

At stage 80 of FIG. 5, the alignment circuitry 24 receives one of the training data sets 30 and its associated ground truth data set 31. The alignment circuitry 24 detects a plurality of anatomical landmarks in the training data set 30. The anatomical landmarks detected in the training data set may correspond to some or all of the reference landmarks 34 that were supplied to the alignment circuitry 24. For example, the alignment circuitry 24 may detect the pineal gland and the base of the pituitary gland in the training data set 30. The alignment circuitry 24 determines a location for each of the detected anatomical landmarks in the coordinate space of the training data set 30.

The location of each landmark in the coordinate space of the training data set 30 may be expected to be different from the location of the corresponding reference landmark in the coordinate space of the atlas data set. For example, the relative locations of the landmarks may differ due to differences in the patient's anatomy from the anatomy represented in the atlas data set, for example a difference in the scale of the patient's head. The locations of the landmarks may differ due to a different in the positioning of the patient from the positioning of the subject of the atlas data set.

Any suitable method for detection of anatomical landmarks may be used. For example, the method of landmark detection may be as described in Mohammad A Dabbah, Sean Murphy, Hippolyte Pello, Romain Courbon, Erin Beveridge, Stewart Wiseman, Daniel Wyeth and Ian Poole, 'Detection and location of 127 anatomical landmarks in diverse CT datasets', *Proc. SPIE* 9034, *Medical Imaging 2014: Image Processing,* 903415 (Mar. 21, 2014).

At stage 82 of FIG. 5, the alignment circuitry 24 aligns the training data set 30 with the atlas data set using the anatomical landmarks detected at stage 80 and the set of reference landmarks 34. The alignment circuitry 24 determines a correspondence between the determined location of each anatomical landmark in the training data set 30 and the location of its corresponding reference landmark. The alignment circuitry 24 performs a rigid registration of the training data set 30 and the atlas data set using the relationship between corresponding landmark locations. For example, the alignment circuitry 24 may align the training data set 30 and atlas data set using a least-squares method to minimise a distance between the locations of the landmarks in the training data set 30 and the locations of the corresponding landmarks in the atlas data set.

The alignment circuitry 24 obtains registration data representative of the results of the rigid registration. In other embodiments, the alignment circuitry 24 may perform any suitable registration (for example, an affine or non-rigid registration) in addition to or instead of the rigid registration, and obtain any suitable registration data. For example, the registration data may comprise a warp field.

An output of stage 82 is a transformed training data set that has been transformed into the coordinate space of the atlas data set.

At stage 84, the alignment circuitry 24 refines a midline of the transformed training data set. The midline is a line of symmetry of the transformed training data set, which in this case is a sagittal line of symmetry. In the present embodiment, an initial midline is obtained from the alignment of the training data set 30 to the atlas data set (using the known midline of the atlas data set)

To refine the midline, the alignment circuitry 24 performs a left-right inversion of the transformed training data set 30 and registers the inverted version of the transformed training data set to the transformed training data set 30 to determine the line of symmetry of the transformed training data set 30. The determined line of symmetry is taken to be the midline of the transformed training data set 30. In other embodiments, any suitable method of determining the midline may be used. In some embodiments, stage 84 is omitted and the midline of the atlas data set is used to determine the midline of the transformed training data set 30.

The output of stage 84 is an atlas-dataset transform that relates the training data set 30 to the atlas data set. The atlas-dataset transform may alternatively be referred to as a reference-dataset transform.

The alignment circuitry 24 transforms the training data set 30 into the coordinate space of the atlas data set, such that the location of each anatomical landmark in the transformed training data set 30 coincides, as nearly as possible, with the location of the corresponding reference landmark in the atlas data set. The transformation may comprise an isotropic resampling of the transformed training data set 30.

In the present embodiment, the training data set 30 and atlas data set are aligned using the locations of landmarks in each of the training data set 30 and atlas data set. In other embodiments, any suitable method may be used to align the training data set 30 with the atlas data set. For example, the training data set 30 and atlas data set may be registered using an intensity-based registration method.

At stage 88, the alignment circuitry extracts a midline centred data set 38 from the transformed training data set (which is now in the coordinate space of the atlas data set, and has had its midline refined from registration with its left-right inversion). The midline centred data set 38 comprises a symmetrical portion of the transformed training data set 30 corresponding to the symmetrical portion of the atlas data set on which the classifier is to be trained (for example, the block shown as 70, 72 in FIG. 4). The portion may be representative of a narrow region of anatomy extracted symmetrically about the determined sagittal midline.

Although in the present embodiment the midline centred data set 38 comprises only a portion of the transformed training data set, in other embodiments the midline centred data set 38 comprises all of the transformed training data set. In some such embodiments, stage 88 may be omitted.

In the present embodiment, one midline centred data set 38 (which may be referred to as one block) is extracted from each transformed training data set. In other embodiments, a plurality of different midline centred data sets (a plurality of blocks) may be extracted from each transformed training data set. For example, each block may be representative of a different part of the brain.

At stage 90 of the process of FIG. 5, the alignment circuitry 24 extracts a midline centred ground truth data set 40 from the ground truth data 31 corresponding to the training data set 30 using the atlas-dataset transform 86 that was obtained by aligning the training data set 30 with the atlas data set (the ground truth data set 32 and training data set 30 are defined in the same coordinate space). The midline centred ground truth data set 40 indicates which voxels of the midline centred data set 38 are normal, don't-care, or abnormal.

The outputs of the process of FIG. 5 are the midline centred data set 38 and midline centred ground truth data set 40, which are of equal dimensions.

The alignment process of FIG. 5 is repeated for each of the plurality of training data sets 30 and associated ground truth data sets 31. At least one midline centred data set 38 and midline centred ground truth data set 40 may be obtained for each of the training data sets 30 and associated ground truth data set 31.

Turning back to FIG. 2, midline centred data sets 38 and midline centred ground truth data sets 40 are shown in FIG. 2 as the outputs of the alignment stage 36. Although in the present embodiment the alignment stage 36 comprises the alignment process described above with reference to FIG. 5, in other embodiments any suitable alignment process may be used.

Each midline centred data set 38 is a symmetrical portion of a transformed training data set. Each midline centred data set 38 is representative of the same anatomical region of the brain. For example, each midline centred data set 38 may comprise a symmetrical block of data as shown as 70, 72 in FIG. 4. In some other embodiments, each midline centred data set 38 comprises a transformation of an entire training data set 30 into the coordinate space of the atlas data set.

In some embodiments, the alignment process of stage 36 outputs more than one midline centred data set 38 for each training data set 30. For a given training data set, each midline centred data set 38 may be representative of a different symmetrical portion of the transformed training data set. Each extracted portion of the transformed training data set may correspond to a different anatomical region. Different portions may be used to train different classifiers. The different portions may overlap.

At stage 42 of the process of FIG. 2 the alignment circuitry 24 passes the midline centred data sets 38 and midline centred ground truth data sets 40 to the training circuitry 26. The training circuitry 26 trains a classifier using some or all of the midline centred data sets 38 and midline centred ground truth data sets 40 received from the alignment circuitry 24. Since in the present embodiment the midline centred data sets 38 are representative of a particular anatomical region (for example, corresponding to the regions shown as 70, 72 in FIG. 4), the classifier is trained for classifying voxels within that anatomical region.

In the present embodiment, the classifier is trained to distinguish between normal and abnormal voxels, where the abnormal voxels are representative of thrombus. In other embodiments, the abnormal voxels may be voxels representative of a different pathology. The abnormal voxels may be voxels representative of any suitable characteristics. In further embodiments, the classifier may be trained to distinguish between more than two classes of voxels. Although only one classifier is trained in the present embodiment, in other embodiments a plurality of classifiers are trained. Different classifiers may be trained for different abnormalities and/or different anatomical regions.

The process used by the training circuitry 26 at stage 42 of FIG. 2 to train the classifier of the present embodiment is represented in overview by the flowchart of FIG. 6. In other embodiments, different classifier training methods may be used at stage 42 of FIG. 2.

The inputs of stage 42 of FIG. 2 are the midline centred data sets 38 and midline centred ground truth data sets 40 obtained from the alignment process of stage 36 of FIG. 2.

The flowchart of FIG. 6 shows a single one of the midline centred data sets 38 and a corresponding midline centred ground truth data sets 40. In practice, the process of FIG. 6 is performed for each of a plurality (optionally, all) of the midline centred data sets 38 and midline centred ground truth data sets 40.

At stage 100 of the process of FIG. 6, the training circuitry 26 receives a midline centred data set 38 (data set X) and midline centred ground truth data set 40 (data set Y). The training circuitry folds the midline centred data set 38 at its midline. The midline may be considered to divide the midline centred data set 38 into a first part (in this case, left part $X_L$) on a first side of the midline and a second part (in this case, right part $X_R$) on an opposite side of the midline. In the folding of stage 100, one of the left part $X_L$ and the right part $X_R$ is inverted with respect to the midline. After inversion, the voxels of the inverted part may be considered to overlay the voxels of the non-inverted part.

Each half of the folded data set may be considered to occupy half of the coordinate space that was occupied by the midline centred data set 38, since it occupies the coordinate space on one side of the midline. (In practice, each half of the folded data set may be extended across the midline by the width of a processing margin in order to be able to train the classifier on data that is positioned near to the midline.)

Figures 7A, 7B, 7C:
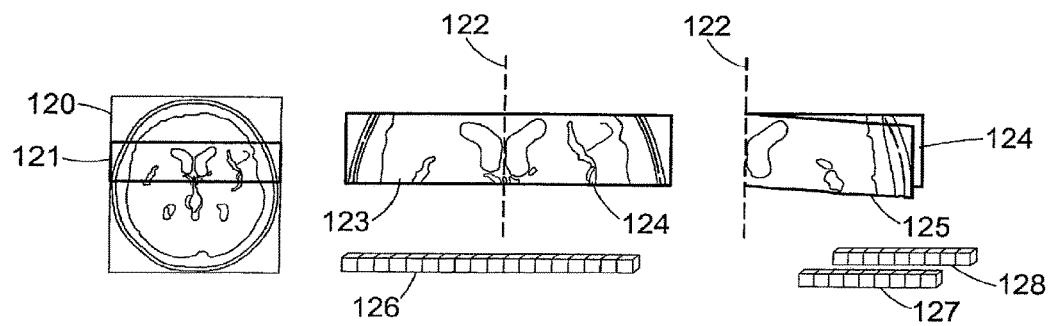
FIGS. 7a, 7b and 7c are schematic diagrams representative of imaging data folding along a midline.

FIG. 7a shows an example of an image 120 derived from a training data set by transforming the training data set into the coordinate space of the atlas data set. A symmetrical portion (block 121) of the image 120 is highlighted in FIG. 7a. The symmetrical portion 121 corresponds to a midline centred data set extracted from the transformed training data set.

FIG. 7b shows the same image portion 121 as FIG. 7a. A line of symmetry 122 is drawn at the midline of the image portion 121, dividing the image portion 121 into a left part 123 to the left side of the midline 122 and a right part 124 to the right side of the midline 122.

In FIG. 7b, the midline centred data set 38 is represented as a set of cubes 126 that may be considered to be representative of voxels. The set of cubes extended across the entire left-right dimension of the image portion, showing that the space on the left and on the right of the midline is occupied before the midline centred data set is folded.

FIG. 7c represents the image portion 121 once it has been folded along the midline 122. In this example, the right part 124 is unchanged by the folding. The left part 123 is inverted, resulting in an inverted left part 125. Right part 124 and inverted left part 125 are overlaid. In practice, right part 124 and inverted left part 125 may be considered to be exactly overlaid, but in FIG. 7c they are shown to be slightly angled with respect to each other for clarity.

Instead of a single set of cubes 126 extending from the left to right of the image portion 121, two sets of cubes 127, 128 are each shown as extending from the midline to the right side of the folded portion, representing the overlaying of voxels of the right part 124 and voxels of the inverted left part 125. Once the folding is performed, right part voxels and inverted left part voxels occupy exactly the same positions in space. One may consider that each pair of mirror-image (right and left part) voxels, each having a respective intensity value, is replaced by a single right part voxel with two intensity values.

The folding of the midline centred data set 38 creates a folded data set that occupies half of the space (in this case, the right half of the space) of the midline centred data set 38. The folded data set comprises left and right channels of intensity data. Each voxel of the folded data set has a first intensity value representative of one of the right part and inverted left part, and second intensity value representative of the other of the right part and inverted left part.

In the present embodiment, two folded data sets 102, 104 are obtained. Each of the folded data sets 102, 104 has different ordering of the channels representative of the left part and of the right part. In the first folded data set 102, intensity data from the left part $X_L$ comes before intensity data from the right part $X_R$. In the second folded data set 104, intensity data from the right part $X_R$ comes before intensity data from the left part $X_L$.

The training circuitry 26 also folds the midline centred ground truth data set 40 at the midline, to obtain a folded ground truth data set. A left part $Y_L$ of the midline centred ground truth data set 40 to the left of the midline corresponds to the left part $X_L$ of the midline centred data set 38. A right part $Y_L$ of the midline centred ground truth data set 40 to the right of the midline corresponds to the right part $X_R$ of the midline centred data set 38.

The left part $Y_L$ of the ground truth data set 40 is associated with the first folded data set 102. The right part $Y_R$ of ground truth data set 40 is associated with the second folded data set 104.

At stage 106, semi-atlas channel data is added to the first folded data set 102 and second folded data set 104. Each of the first folded data set 102 and second folded data set 104 comprises two intensity channels representing intensities of the left and right parts $X_L$, $X_R$ (with the first folded data set 102 listing the intensity of the left part voxels first, and the second folded data set 104 listing the intensity of the right part voxels first). In the present embodiment, the semi-atlas channel data comprises three extra channels, which are representative of x, y and z coordinates for each voxel in the coordinate space of the folded data sets.

Because of the alignment process described above, the coordinate space of the folded data sets is the same as the coordinate space of the atlas data set. However, because of the folding process, the folded data sets occupy only one half of that coordinate space (in this case, the right half).

The resulting first folded data set comprises, for each voxel: intensity of that voxel in the left part; intensity of that voxel in the inverted right part; x coordinate; y coordinate; z coordinate. In the second folded data set, the order of the intensities is reversed.

In some other embodiments, no x, y and z channels are added to the folded data sets. Stage 106 of FIG. 6 may be omitted.

In further embodiments, different representations of the semi-atlas may be used. In some embodiments, the atlas data set is segmented and voxels of the atlas data set are labelled to indicate the anatomical structure to which they belong.

In one such embodiment, the semi-atlas channel data added at stage 106 comprises a label for each voxel, obtained by correspondence with the segmented atlas data set. In another embodiment, each segmented region of the atlas data set is used as an individual binary mask, and the semi-atlas channel data comprises data from those binary masks.

In a further embodiment, binary masks are used to determine distance transforms. Each distance transform is representative of a distance from the edge of a binary region, and may indicate whether a given voxel is inside or outside a particular binary region and whether it is close to the boundary. The semi-atlas channel data may comprise values for distance transforms for each voxel.

After the x, y, z channels are added to the folded data sets, the folded data sets are combined to provide a combined folded data set. In the present embodiment, the folded data sets are concatenated to form the combined folded data set. In other embodiments, any suitable method of combining the folded data sets may be used. In further embodiments, the folded data sets may not be combined.

The folding of the midline centred data set 38 may allow the training of a classifier that uses data from both sides of the midline centred data set 38 in order to identify abnormal voxels. By adding x, y, z channels, the classifier may also be trained to use position data in order to identify abnormal voxels. The position data may in some circumstances act as a prior, since there may be some positions in which the pathology of interest is particularly likely to occur. In other embodiments, any suitable semi-atlas channel data may be used in training the classifier to use anatomical information (for example, whether a voxel is part of a particular anatomical structure) in order to identify abnormal voxels.

Figure 8:
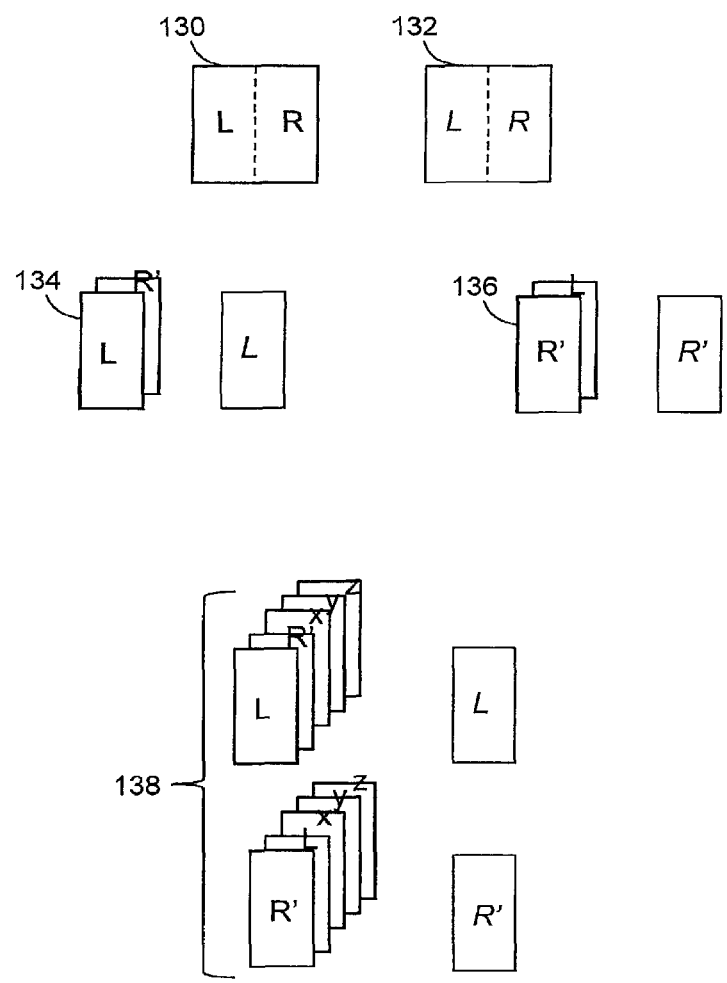
FIG. 8 is a schematic diagram representative of folded data.

FIG. 8 provides an schematic representation of the folding of a midline centred data set and corresponding midline centred ground truth data set.

A midline centred data set 130 comprises a left part, L, and a right part, R. A corresponding midline centred ground truth data set 132 comprises a left part, L, and a right part, R. The midline centred data set 130 is folded by inverting the right part R to obtain an inverted right part R'. The midline centred ground truth data set 132 is folded by inverting the right part R to obtain an inverted right part, R'.

A first folded data set 134 has a first intensity channel comprising intensities of the left part L of the midline centred data set 130, and a second intensity channel comprising intensities of the inverted right part R' of the midline centred data set 130. First folded data set 134 is grouped with the left part L of the midline centred ground truth data set 132.

A second folded data set 136 has a first intensity channel comprising intensities of the inverted right part R' of the midline centred data set 130, and a second intensity channel comprising intensities of the left part L of the midline centred data set 130. First folded data set 134 is grouped with the inverted right part R' of the midline centred ground truth data set 132.

Additional x, y, z channels are added to the first folded data set 134 and second folded data set 136, and the folded datasets are concatenated to provide a single data set 138.

Returning to FIG. 6, the output of stage 106 is a combined folded data set having five channels: two intensity channels (with half the data using one ordering of intensity channels and half the data using the other ordering of intensity channels) and x, y, z channels.

At stage 108, the training circuitry extracts sub-sets of data from the combined folded data set. The sub-sets of data may be referred to as patches. Each patch is representative of a smaller sub-region of the region that is represented by the combined folded data set.

In some cases, if a classifier were to be trained on all the data in each midline centred data set 38, the training process may be very computationally intensive. The regions of abnormality 32 in each of the training data sets 30 may be very small compared to the size of those data sets. Even if midline centred data sets 38 are obtained that represent only a particular anatomical region of the anatomy covered by the initial training data sets 30, the voxels that have been identified by an expert as abnormal may still occupy only a very small part of the midline centred data sets 38.

In some circumstances, it may be preferable to train a classifier on data in which the number of abnormal voxels used in training is similar to the number of normal voxels used in training. If it is not possible to use the same number of normal and abnormal voxels, it may be preferable at least to reduce the number of normal voxels compared to the number of abnormal voxels to a suitable level.

The training circuitry 98 selects one or more patches of the combined folded data sets on which to train a detector. The patches may be small sub-regions of a region represented by the combined folded data set. For example, in the present embodiment, each patch is 10×10×10 voxels in size. In other embodiments, any suitable size of patches may be used.

Although in the present embodiment, the size of each patch is 10×10×10 voxels, a larger portion of the data may be used in the training of the classifier, because the classifier may use properties of the neighborhood of each voxel. A processing margin may be added to each patch. The processing margin may comprise a boundary region, where the boundary region is outside the boundary of that patch.

In the present embodiment, the training circuitry 28 selects, for each of the combined folded data sets, one or more patches that include voxels identified as abnormal by the expert in the corresponding ground truth data. For each of the combined folded data sets, the training circuitry 28 may also select one or more patches that include voxels that the expert has identified as normal.

For each patch location, two training patches are obtained. For each spatial location, the combined folded data set comprises two entries, one in which the intensity of the right part is listed first, and one in which the intensity of the left part is listed first. A first training patch is obtained in which the intensity of the right part is listed first, and one in which the intensity of the left part is listed first.

The two training patches for a given patch location may be listed as A and B:
A. ch0=left intensity, ch1=right intensity, GT class=from left
B. ch0=right intensity, ch1=left intensity, GT class=from right
where ch0, ch1 are the first and second intensity channels, and GT class indicates which part of the ground truth data is used.

At stage 110, the training circuitry trains a detector on the patches that were extracted from the combined folded data sets. The detector comprises a classifier that is trained to detect abnormal voxels, which in the present embodiment are voxels of thrombus.

The detector is trained such that it is left-right agnostic. The detector is trained to use first and second intensity data without taking into account whether the first intensity data came from the left or from the right side.

In some embodiments, a boosting method is used to train the detector. The detector may be partially trained using some randomly selected abnormal data, then some data may be excluded to force the classifier to focus on particularly relevant areas (for example, to train the classifier to distinguish between dense vessels and a calcified pineal gland).

In the present embodiment, the classifier comprises a convolutional neural network, for example a convolutional neural network as described in Matthew Brown and Saeed Shiry Ghidary, 'Convolutional neural networks for image processing: an application in robot vision'. *The 16$^{th}$ Australian Joint Conference on Artificial Intelligence, AI'03*, December 2003. In other embodiments, the classifier may comprise any suitable classifier, for example a neural network or a random decision forest.

The classifier training process determines convolutions both spatially (for example, by determining texture features) and across channels. The convolutions may make use of properties of the neighborhood of each voxel as well as properties of the voxel itself. The convolutions may use intensity data in combination with spatial data. Each convolution may comprise a weighting of image intensities.

Although one particular data set is shown in FIG. 6, the detector is trained on patches derived from a plurality (optionally, all) of the training data sets.

In many pathologies, including subtle stroke signs such as thrombus or ischemia, a human expert detecting the pathology would compare the left and right side of an image of a substantially symmetrical anatomical structure to determine whether the pathology is present. By obtaining a folded data set having two intensity channels, the classifier may also be trained to compare left side and right side data to determine whether the pathology of interest is present. A human expert may also make use of anatomical context. By including semi-atlas channels in the training data, the classifier may also be trained to make use of anatomical context. Since each training data set is aligned to the atlas data set, corresponding positions in different training data sets may be representative of the same anatomy.

Furthermore, the selection of a block rather than the whole data set may allow a classifier to be trained for a specific anatomical region. In some circumstances, different classifiers may be trained for different anatomical regions, for example for different parts of the brain.

The output of the process of FIG. 6 is a trained detector 44 that has been trained to detect abnormal voxels (which in the present embodiment are voxels of thrombus).

The trained detector 44 is trained to detect whether a voxel is abnormal using a set of criteria that do not depend on whether the voxel is on the right or left of a data set, but may take into account the intensity of the voxel and of its mirror-image voxel, the neighborhood of the voxel, and the location of the voxel in the coordinate space of the atlas data set.

By creating two folded data sets from each midline centred data set 38, training data may be used efficiently. In some circumstances, there may be a shortage of suitable training data available. By using two folded data sets (each having a different ordering of intensity data), the available training data may be considered to be doubled. Each set of training data may be used twice in the training process, once for the left part of the training data and once for the right part of the training data.

Turning again to FIG. 2, the trained detector 44 is the output of stage 42. Although in the present embodiment the detector 44 was trained using the process of FIG. 6, in other embodiments any suitable training process using data from both sides of a line of symmetry may be used to train the detector 44 to detect abnormal voxels.

At stage 48 of FIG. 2, a novel data set 46 is received by the detection circuitry 28. The novel data set is a data set for which no ground truth is known. It is not known whether the novel data set comprises abnormal voxels. The novel data set may be received from the CT scanner 14 or from storage (for example, PACS).

The detection circuitry 28 aligns the novel data set 46 with the atlas data set. In the present embodiment, the detection circuitry 28 aligns the novel data set 46 with the atlas data set using the alignment method described above with reference to FIG. 5. In other embodiments, any alignment method may be used.

As part of the alignment method, the detection circuitry 28 detects anatomical landmarks in the novel data set 46, aligns the novel data set 46 with the atlas data set using the landmarks, refines a midline of the novel data set, determines an atlas-data set transform for the novel data set 46, and extracts a novel midline centred data set 140 from the transformed novel data set. The novel midline centred data set 140 corresponds to the same symmetrical portion of the atlas data set (for example, the portion represented as 70, 72 in FIG. 4) as the midline centred data sets 38 that were used to train the classifier.

At stage 50 of the process of FIG. 2, the detection circuitry 28 uses the trained detector 44 to determine the presence or absence of abnormal voxels (in this embodiment, voxels of thrombus) in the novel midline centred data set 140. Any suitable detection process may be used to determine the presence or absence of such abnormal voxels. In the present embodiment, the detection process used is shown in detail in the flow chart of FIG. 9.

Turning to FIG. 9, at stage 142 the detection circuitry 28 folds the midline centred data set 140 (data set X) at its midline (which has been determined during its alignment at stage 48) to obtain a first part $X_L$ and a second part $X_R$. Folding at the sagittal midline produces a two-channel volume, one of which channels is mirror-imaged.

The detection circuitry 28 obtains two folded data sets 144, 150. A first folded data set 144 comprises a first channel representative of intensity of the left part of the midline centred data set and a second channel representative of intensity of the right part of the midline data set. A second folded data set 150 comprises a first channel representative of intensity of the right part of the midline centred data set and a second channel representative of intensity of the left part of the midline data set.

The first folded data set 144 and second folded data set 150 are treated separately. Since the trained detector 44 classifies left or right agnostically, it is applied twice during detection. It is applied to the left part and right part separately.

At stage 146, semi-atlas channels which in this embodiment comprise x, y and z coordinates for the left part of the midline centred data set are added to the first folded data set. At stage 148, the trained detector 44 is applied to the first folded data set, to which the semi-atlas channels have been added. The trained detector 44 detects abnormal voxels in the left part of the midline centred data set 140 using intensities of the left part, intensities of the right part, and x, y, z coordinates.

At stage 152, semi-atlas channels comprising x, y and z coordinates for the left part of the midline centred data set are added to the second folded data set. At stage 154 the trained detector 44 is applied to the second folded data set, to which the semi-atlas channels have been added. The trained detector 44 detects abnormal voxels in the right part of the midline centred data set 140 using intensities of the right part, intensities of the left part, and x, y, z coordinates.

In some alternative embodiments, semi-atlas channels are not added and stages 146 and 152 may be omitted. In further embodiments, different semi-atlas channel is used, for example labels or binary mask data.

The trained detector 44 applied to the first folded data set (in which left data is listed first) is the same as the trained detector 44 applied to the second folded data set (in which right data is listed first). In detecting abnormal voxels, the trained detector 44 does not take into account whether the abnormal voxel came from the left side or the right side of the novel midline centred data set 140.

In stages 148 and 154 of the present embodiment, the training circuitry 28 assigns to each voxel a probability that the voxel is abnormal. For example, the training circuitry 28 may assign to each voxel a probability between 0 and 1. The training circuitry 28 may assign a z-score to each voxel.

At stage 156 of the process of FIG. 9, the detection circuitry 28 adds the results for the left part that were obtained at stage 148 to the results for the right part that were obtained at stage 154. The detection circuitry 28 thereby obtains a probability for each voxel in the novel midline centred data set 140.

The detection circuitry 28 outputs a probability volume 52 that comprises, for each voxel of the novel midline centred data set 140, a probability that the voxel is abnormal.

Turning back to FIG. 2, the output of the detection of stage 50 is the probability volume 52. Although in the present embodiment, the detection of stage 50 is performed using the process of FIG. 9, in other embodiments any suitable detection process may be used.

At stage 54, the detection circuitry 28 compares each of the probabilities in the probability volume 52 to a threshold value. In the present embodiment, the threshold value is a fixed value stored by the detection circuitry 28. In some embodiments, the threshold value may be selected by a user. The threshold value may be selected to provide a desired sensitivity and specificity of detection. For example, the threshold value may be selected to result in a low number of false negatives.

For a given voxel, if the probability of being abnormal is above the threshold value, the detection circuitry classifies the voxel as abnormal. If the probability of being abnormal is below the threshold value, the detection circuitry classifies the voxel as normal. The detection circuitry 28 labels each of the voxels of the midline centred data set 140 as normal or abnormal, for example by assigning −1 to the normal voxels and 1 to the abnormal voxels.

At stage 56 of the process of FIG. 2, the detection circuitry 28 groups the voxels that have been classified as abnormal into abnormal regions. Any suitable method may be used to group the voxels classified as abnormal into abnormal regions. For example, connected component analysis may be used. If there is more than one abnormal region, the detection circuitry 28 ranks the abnormal regions. For example, the detection circuitry 28 may rank the abnormal regions by size. The detection circuitry 28 may rank the abnormal regions by probability.

At stage 58, the detection circuitry 28 presents the ranked abnormal regions to a clinician (for example a radiologist) or other user. In the present embodiment, the detection circuitry 28 renders an image from the novel data set 46. The detection circuitry 28 transforms the abnormal region or regions that were obtained in the coordinate space of the atlas data set into the coordinate space of the novel data set, for example using alignment data that was generated at stage 48 of FIG. 2. The detection circuitry displays the abnormal region or regions on the rendered image. In other embodiments, any suitable image may be rendered.

Each abnormal region is displayed in a different colour. A list of detections is displayed that is ranked by probability. Clicking on a listing of an abnormal region navigates to an MPR (multi-planar reformatting) view of the abnormal region. Each detected abnormal region is highlighted by colour in the MPR view. The user interface allows easy removal of highlighting.

Although in the present embodiment a single classifier is trained and used to detect a single abnormality (thrombus), in some embodiments multiple classifiers may be trained and used. The presentation at stage 58 may comprise regions of abnormality detected by different classifiers. For example, different classifiers may be used to detect different pathologies, or different classifiers may be used to detect a pathology in different anatomical regions. In one such embodiment, the training circuitry 28 renders an image in which regions of a first abnormality (detected by a first classifier) and regions of a second abnormality (detected by a second classifier) are displayed, for example in different colours. In one embodiment, a list is displayed which lists for each of the abnormal regions the colour in which that abnormal region is rendered; a type of abnormality (for example, ischemia or dense vessel); an anatomical location for the abnormal region (for example, perisylvian cortex or left MCA); a size of the abnormal region; and a confidence level for the detection.

In some embodiments, abnormal regions are displayed by rendering them in a different colour from regions that are classified as normal. In some embodiments, a colour in which an abnormal region is rendered may depend on its ranking. In some embodiments, ranking may be indicated by numbers. In other embodiments, any suitable display method may be used.

In some embodiments, the clinician or other user is provided with a list of abnormal regions. The list of abnormal regions may also contain additional information about the abnormal regions, for example ranking, size or location information.

Although in the present embodiment, each voxel is labelled and displayed as either abnormal or normal, in other embodiments the presentation to the clinician or other user uses the probabilities from the probability volume. For example, a colour gradient may be used in which each colour on the colour gradient represents a different probability value.

If no abnormal voxels are detected by the classifier, at stage 58 the detection circuitry 28 may provide an indication to the clinician or other user of the absence of such abnormal voxels.

In other embodiments, the detection circuitry 28 may provide any suitable output that is representative of an output of the trained detector 44. The output may represent a probability of the presence of an abnormality at each of a plurality of voxel positions. The output may be representative of the presence of an abnormality as a function of position.

The clinician or other user may use the information presented to identify regions of the image for further inspection. For example, in the present embodiment, the presentation may indicate several possible regions of thrombus. A clinician may inspect each of the possible regions of thrombus to determine, in his or her opinion, whether each of the regions is actually a region of thrombus.

The method of FIG. 2 was applied for detection of stroke signs in non-contrast CT. A result was obtained from a volume that was not included in training. Quantitative evaluation was performed across 120 volumes, divided evenly between training an test. An ROC AUC (receiver operating characteristic area under curve) of 98.4% was achieved.

By providing a training and detection method as described above with reference to FIG. 2, a classifier may be trained to detect an abnormality in a substantially symmetrical anatomical structure. The classifier may detect the abnormality using intensity data from both sides of the substantially symmetrical anatomical structure, for example by comparing intensities of a given voxel and its mirror image. Data folding and bilateral information extraction may be used. By using intensity data from channels representative both sides of a substantially symmetrical anatomical structure, the data from one channel may be considered to normalise the data from the other channel. The classifier may learn to normalise intensities in one channel with respect to intensities from the other channel.

In interpreting image data, a human expert (for example, a neuroradiologist) may make use of learned experience from viewing thousands of examples. The human expert may also make use of expected approximate left/right symmetry where relevant. The human expert may make use of anatomical context. In the method of FIG. 2, the training of the classifier makes use of learned experience from a large number of training data sets. The classifier makes use of expected approximate left/right symmetry where appropriate, for example by using a difference in intensity between each voxel and its mirror image. The classifier is able to perform bilateral comparison. The classifier may make use of anatomical context since it is trained on x, y, z coordinate data in addition to intensity data.

The method of FIG. 2 may achieve automatic detection through a particular supervised learning model. The use of automated detection may provide information to a clinician that may increase the speed or accuracy of the clinician's analysis of an image, particularly when subtle signs of pathology are present.

In some circumstances, the classifier or classifiers trained and used in the method of FIG. 2 may not classify whole images, but may instead highlight regions with pathologies. CNN may be used to automatically extract features from patches.

Using a left-right agnostic classifier may allow each set of training data to be used twice in training, once for the left side of the training data and once for the right side. A left-right agnostic classifier may be appropriate for detecting abnormalities in a substantially symmetrical anatomical structure in which an abnormality may occur on either side of the anatomical structure.

For example a thrombus may occur on the right side of the brain, causing a region of the right side of the brain to appear denser than a corresponding region on the left side of the brain. Or a thrombus may occur on the left side of the brain, causing a region of the left side of the brain to appear denser than a corresponding region on the right side of the brain. The same classifier may be used to detect the thrombus whether it is on the left or the right side.

In the embodiment described above, the method of FIG. 2 is used to detecting signs of thrombus in non-contrast CT acquired for acute stroke. In other embodiments, the method of FIG. 2 may be applicable to other modalities and/or abnormalities.

The method of FIG. 2 may be used to train a classifier to detect one or more subtle stroke signs, for example ischemia and/or infarcts. A classifier may be used to identify regions of slightly lowered intensity which may be representative of ischemia and/or infarcts. A classifier may be used to detect a loss of gray matter or a loss of white matter. A classifier may be used to detect calcification.

In one embodiment, a classifier is trained to detect ischemia. In some circumstances, ischemia may appear in an imaging data set as a very large region of one side of the brain, which has a slightly lowered intensity compared with the other side of the brain. By using a comparison between the two sides of the brain, the large region of lowered intensity may be identified. In some circumstances, such a large region of lowered intensity may not be identified by a classifier that did not use data from both sides of the brain in order to classify voxels. The classifier may be trained so as to at least partially normalise data values of the first part of the set of medical imaging data relative to the second part of the set of medical imaging data, for example in training, the classifier may discover rules which have the effect of at least partially normalising data values of the first part of the set of medical imaging data relative to data values of the second part of the set of medical imaging data.

The method of FIG. 2 may be applied to the detection of any appropriate abnormality, for example any appropriate pathology, in any appropriate human or animal anatomy. The method of FIG. 2 may be applied to the analysis of images indicating function, for example tissue motion or liquid flow.

In some embodiments, the method of FIG. 2 is applied to the detection of fractures. For example, a classifier may be trained to detect subtle fractures of the pelvis by using data from the left and right side of the pelvis.

Any suitable modality of data may be used, for example CT data, cone-beam CT data, X-ray data, ultrasound data, MR data, PET data or SPECT data.

Certain embodiments provide a method of identifying pathology in volumetric data where normal anatomy is mostly symmetrical, comprising: for each volume in which pathology has been manually marked, aligning the volume to a reference atlas, dividing the data at a midline, inverting one half of the data to produce two aligned left/right channels, and extracting training samples representing left and right pathology status; training a classifier on a total set of training samples; and, for a novel volume, aligning the novel volume to a reference atlas, dividing the novel volume data at a midline, inverting one half of the novel volume data to produce two aligned left/right channels, and applying the trained classifier separately for the left and right results, channels being appropriately ordered in each case.

Further channels may be added to encode atlas location. The classifier may comprise a convolutional neural network. The classifier may comprise a decision forest. The dividing of the data at a midline may comprise extraction of multiple blocks defined in atlas space. Each block location may be trained for separately.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments have been described, these embodiments have been presented by way of example only, and are not intended to limit the scope of the invention. Indeed the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. A medical image data processing apparatus comprising processing circuitry configured to:
receive a plurality of sets of medical imaging data; and
train a classifier for use in classification, wherein
the training of the classifier comprises, for each of the plurality of sets of medical imaging data:

selecting a first part and a second part of the respective set of medical imaging data, wherein the first part and the second part are representative of different regions of the same subject; and training the classifier for use in classification based on the first part of the set of medical imaging data and the second part of the set of medical imaging data, and the training of the classifier for use in classification based on the first part of the set of medical imaging data and the second part of the set of medical imaging data comprises training the classifier for use in determining presence or absence of at least one abnormality in the first part of the set of medical imaging data based at least partially on the second part of the set of medical imaging data and ground truth data associated with the first part of the set of medical imaging data.

2. An apparatus according to claim 1, wherein the first part and the second part of the set of medical imaging data are representative of at least one of: substantially symmetrical regions; or regions having substantially the same shape.

3. An apparatus according to claim 1, wherein:
the first part of the set of medical imaging data is representative of a region on one side of a line of symmetry of anatomical structure represented by the medical imaging data;
the second part of the set of medical imaging data is representative of a region on an opposite side of the line of symmetry; and
wherein the first part of the set of medical imaging data and second part of the set of medical imaging data are representative of corresponding anatomical features on opposite sides of the line of symmetry.

4. An apparatus according to claim 3, wherein the training of the classifier for use in determining the presence or absence of at least one abnormality in the first part of the medical imaging data based at least partially on the second part of the set of medical imaging data is such as to at least partially normalise data values of the first part of the set of medical imaging data relative to the second part of the set of medical imaging data.

5. An apparatus according to claim 3, wherein the processing circuitry is configured to, for each of the sets of medical imaging data, perform a folding process about said line of symmetry in respect of one of the first and second parts of the medical imaging data set such that imaging data of the first part at least partially overlays imaging data of the second part.

6. An apparatus according to claim 1, wherein the processing circuitry is configured to select boundaries of the first and second parts based on at least one of ground truth data, expected position of one or more abnormalities, or a position of at least one selected anatomical feature.

7. An apparatus according to claim 3, wherein the processing circuitry is configured to modify the ground truth data for at least some positions adjacent to regions of abnormality indicated by the ground truth data, and to use the modified ground truth data in training the classifier.

8. An apparatus according to claim 7, wherein the processing circuitry is configured to adjust the importance of at least some of the modified ground truth data in training the classifier.

9. An apparatus according to claim 1, wherein the processing circuitry is further configured to at least one of:
use atlas data in training the classifier;
use expected or actual position of at least one anatomical feature in training the classifier;
align at least one of the medical imaging data sets with at least one atlas data set to obtain registration data, and use the registration data in training the classifier.

10. A medical image data processing method comprising:
receiving a plurality of sets of medical imaging data; and
training a classifier for use in classification, wherein
the training of the classifier comprises, for each of the plurality of sets of medical imaging data:
selecting a first part and a second part of the respective set of medical imaging data, wherein the first part and the second part are representative of different regions of the same subject; and
training the classifier for use in classification based on the first part of the set of medical imaging data and the second part of the set of medical imaging data, and
the training of the classifier for use in classification based on the first part of the set of medical imaging data and the second part of the set of medical imaging data comprises training the classifier for use in determining presence or absence of at least one abnormality in the first part of the set of medical imaging data based at least partially on the second part of the set of medical imaging data and ground truth data associated with the first part of the set of medical imaging data.

11. A method according to claim 10, wherein the first part and the second part of the set of medical imaging data are at least one of: representative of substantially symmetrical regions; or regions having substantially the same shape.

12. A method according to claim 10, wherein:
the first part of the set of medical imaging data is representative of a region on one side of a line of symmetry of anatomical structure represented by the medical imaging data;
the second part of the set of medical imaging data is representative of a region on an opposite side of the line of symmetry; and
wherein the first part of the set of medical imaging data and second part of the set of medical imaging data are representative of corresponding anatomical features on opposite sides of the line of symmetry.

13. A method according to claim 12, wherein the training of the classifier for use in determining the presence or absence of at least one abnormality in the first part of the medical imaging data based at least partially on the second part of the set of medical imaging data is such as to at least partially normalise data values of the first part of the set of medical imaging data relative to the second part of the set of medical imaging data.

14. A method according to claim 12, further comprising, for each of the sets of medical imaging data, performing a folding process about said line of symmetry in respect of one of the first and second parts of the medical imaging data set such that imaging data of the first part at least partially overlays imaging data of the second part.

15. A method according to claim 10, further comprising selecting boundaries of the first and second parts based on at least one of ground truth data, expected position of one or more abnormalities, or a position of at least one selected anatomical feature.

16. A method according to claim 12, further comprising modifying the ground truth data for at least some positions adjacent to regions of abnormality indicated by the ground truth data, and using the modified ground truth data in training the classifier.

17. A method according to claim 16, further comprising adjusting the importance of at least some of the modified ground truth data in training the classifier.

18. A method according to claim 10, further comprising at least one of:
- using atlas data in training the classifier;
- using expected or actual position of at least one anatomical feature in training the classifier;
- aligning at least one of the medical imaging data sets with at least one atlas data set to obtain registration data, and using the registration data in training the classifier.

* * * * *